United States Patent
Gilhuijs et al.

[19]

[11] Patent Number: 6,112,112
[45] Date of Patent: Aug. 29, 2000

[54] METHOD AND SYSTEM FOR THE ASSESSMENT OF TUMOR EXTENT IN MAGNETIC RESONANCE IMAGES

[75] Inventors: Kenneth Gilhuijs, Chicago; Maryellen L. Giger, Elmhurst; Ulrich Bick, Chicago, all of Ill.

[73] Assignee: Arch Development Corporation, Chicago, Ill.

[21] Appl. No.: 09/156,413

[22] Filed: Sep. 18, 1998

[51] Int. Cl.[7] .................................................. A61B 5/055
[52] U.S. Cl. ........................ 600/425; 378/37; 378/62; 382/128; 382/131; 382/132; 600/420
[58] Field of Search .................................... 324/309, 307; 378/37, 62; 600/410, 425, 420; 382/128, 131, 132, 224, 225, 226, 227

[56] References Cited

U.S. PATENT DOCUMENTS

| | | | |
|---|---|---|---|
| 5,579,360 | 11/1996 | Abdel-Mottaleb | 378/37 |
| 5,615,243 | 3/1997 | Chang et al. | 378/37 |
| 5,627,907 | 5/1997 | Gur et al. | 382/132 |
| 5,644,232 | 7/1997 | Smith | 324/309 |
| 5,768,333 | 6/1998 | Abdel-Mottaleb | 378/37 |
| 5,796,862 | 8/1998 | Pawlicki et al. | 382/132 |
| 5,818,231 | 10/1998 | Smith | 324/309 |
| 5,982,917 | 11/1999 | Clarke et al. | 382/132 |
| 6,026,316 | 2/2000 | Kucharczyk et al. | 600/420 |

*Primary Examiner*—Marvin M. Lateef
*Assistant Examiner*—Eleni Mantis Mercader
*Attorney, Agent, or Firm*—Oblon, Spivak, McClelland, Maier & Neustadt, P.C.

[57] ABSTRACT

A method, computer program product, and system for assessing tumor extent in medical temporally acquired images. The method, on which the computer program product and system is based, includes obtaining image data corresponding to temporally acquired images including a tumor and surrounding anatomy and performing variance processing on the obtained image data to derive variance image data defining a variance image indicative of variation of voxels in the temporally acquired medical images. Techniques include novel developments and implementations of breast volume segmentation, breast border removal, lesion enhancement, determination of the bounding sphere, computation of a 3-D search volume, suppression of surrounding structures, and volume growing. Output from the methods yields an estimate of the extent of the tumor (lesion) in the breast.

87 Claims, 18 Drawing Sheets z=32.7 mm z=36.7 mm

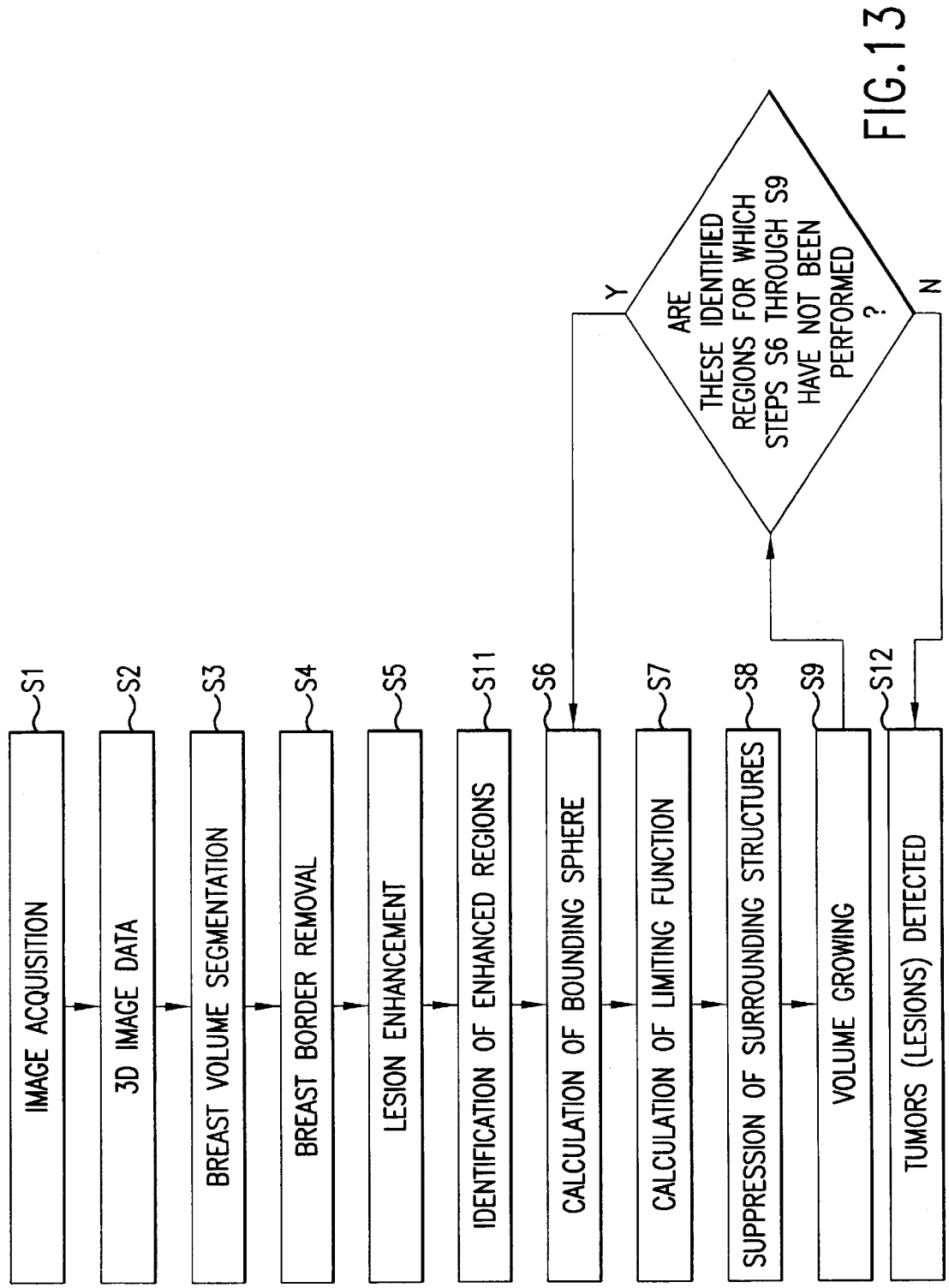

METHOD AND SYSTEM FOR THE ASSESSMENT OF TUMOR EXTENT IN MAGNETIC RESONANCE IMAGES

The present invention was made in part with U.S. Government support under grant numbers DAMD 17-96-1-6058 and DAMD 17-98-1-8194 from the US Army Medical Research and Material Command and grant number RR11459 from the NIH USPHS. The U.S. Government has certain rights in this invention.

BACKGROUND OF THE INVENTION

1. Field of the Invention

The invention relates generally to a method and system for the computerized assessment of tumor extent in magnetic resonance images. Accurate quantification of the shape and extent of breast tumors is of interest for the assessment of the likelihood of malignancy, the response to therapy, the planning of radiation and/or surgical procedures, and to establish a reliable predictor for disease-free survival. Specifically, the system includes the assessment of tumor extent in the breast using three-dimensional analyses. Techniques include novel developments and implementations of breast volume segmentation, breast border removal, lesion enhancement, determination of the bounding sphere, computation of a 3-D search volume, suppression of surrounding structures, and volume growing. Output from the methods yields an estimate of the extent of tumor (lesion) in the breast. The system also includes an option to use the methods for initial detection of lesions in the breast.

The present invention generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; and 5,740,268; as well as U.S. patent application Ser. Nos. 08/158,388; 08/173,935; 08/220,917; 08/398,307; 08/428,867; 08/523,210; 08/536,149; 08/536,450; 08/515,798; 08/562,087; 08/757,611; 08/758,438; 08/900,191; 08/900,361; 08/900,362; 08/900,188; and 08/900,189, 08/900,192; 08/979,623; 08/979,639; 08/982,282; 09/027,468; 09/027,685; 09/028,518; 09/053,798; 09/092,004; 09/098,504; 09/121,719; 09/131,162; and 09/141,535 all of which are incorporated herein by reference.

The present invention includes use of various technologies referenced and described in the above-noted U.S. patents and applications, as well as described in the references identified in the appended APPENDIX and cross-referenced throughout the specification by reference to the author(s) and year of publication, in brackets, of the respective references listed in the APPENDIX, the entire contents of which, including the related patents and applications listed above and references listed in the APPENDIX, are incorporated herein by reference.

2. Discussion of the Background

Accurate quantification of the shape and extent of breast tumors is of interest for the assessment of the likelihood of malignancy, the response to therapy, the planning of radiation and/or surgical procedures, and to establish a reliable predictor for disease-free survival. Magnetic resonance imaging (MRI) has been shown to yield higher correlation between measured tumor size and actual tumor size than mammography and sonography [Gribbestad et al., 1992; Boetes et al., 1995; Davis et al., 1996; Mumtaz et al., 1997]. Currently, MR images are typically examined on a slice-by-slice basis, thus not taking full advantage of the three-dimensional (3-D) nature of the data. The analysis is often performed visually by radiologists. Visual assessment of the 3-D extent of lesions from two-dimensional (2-D) cross sections may be difficult, especially in irregular masses. Random variations of up to 30% have been reported between the true and the observed tumor size using MRI [Boetes et al., 1995]. These variations may be due, in part, to inter- and intra-observer differences in the analysis.

Automated techniques for the segmentation of breast lesions may improve the objectivity and the consistency of the results. Semi-automated methods for lesion segmentation have been developed in other areas such as mammography [Kupinski, 1998]. Computerized methods based on 2-D slice-by-slice analysis of MR images have also been proposed [Lucas, 1996]. In a previous study, the present inventors developed a method for computerized assessment of the malignancy of suspicious masses in MR images [Gilhuijs et al., 1998], based on interactive segmentation of the lesion by a radiologist.

SUMMARY OF THE INVENTION

Accordingly, an object of this invention is to provide a method and system for the assessment of tumor extent in magnetic resonance (MR) images.

Another object of the invention is to provide an automated method and system for automatic volume growing of lesions in MR images.

Another object of the invention is to provide an automated method and system for lesion enhancement in MR images.

Another object of the invention is to provide an automated method and system for the detection of lesions (tumors) in MR images of the breast.

Another object of the is to provide a method and system for the automated 3-D segmentation of breast lesions in contrast enhanced MRI data.

These and other objects are achieved according to the invention by providing a new and improved automated method, storage medium storing a program for performing the steps of the method, and system for assessing tumor extent in medical temporally acquired images. The method, on which the computer program product and system is based, includes obtaining image data corresponding to temporally acquired images including a tumor and surrounding anatomy and performing variance processing on the obtained image data to derive variance image data defining a variance image indicative of variation of voxels in said temporally acquired medical images.

Techniques include novel developments and implementations of breast volume segmentation, breast border removal, lesion enhancement, determination of the bounding sphere, computation of a 3-D search volume, suppression of surrounding structures, and volume growing. Output from these techniques yields an estimate of the extent of tumor (lesion) in the breast.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 13 is a flowchart describing a method for the computerized detection of lesions (tumors) within volume images of the breast by iteratively performing the volume growing and subsequent assessment of tumor extent at all regions exhibiting high uptake (of the contrast agent) that result from the variance or time-weighted variance enhancement;

DETAILED DESCRIPTION OF THE PREFERRED EMBODIMENTS

Figure 1:
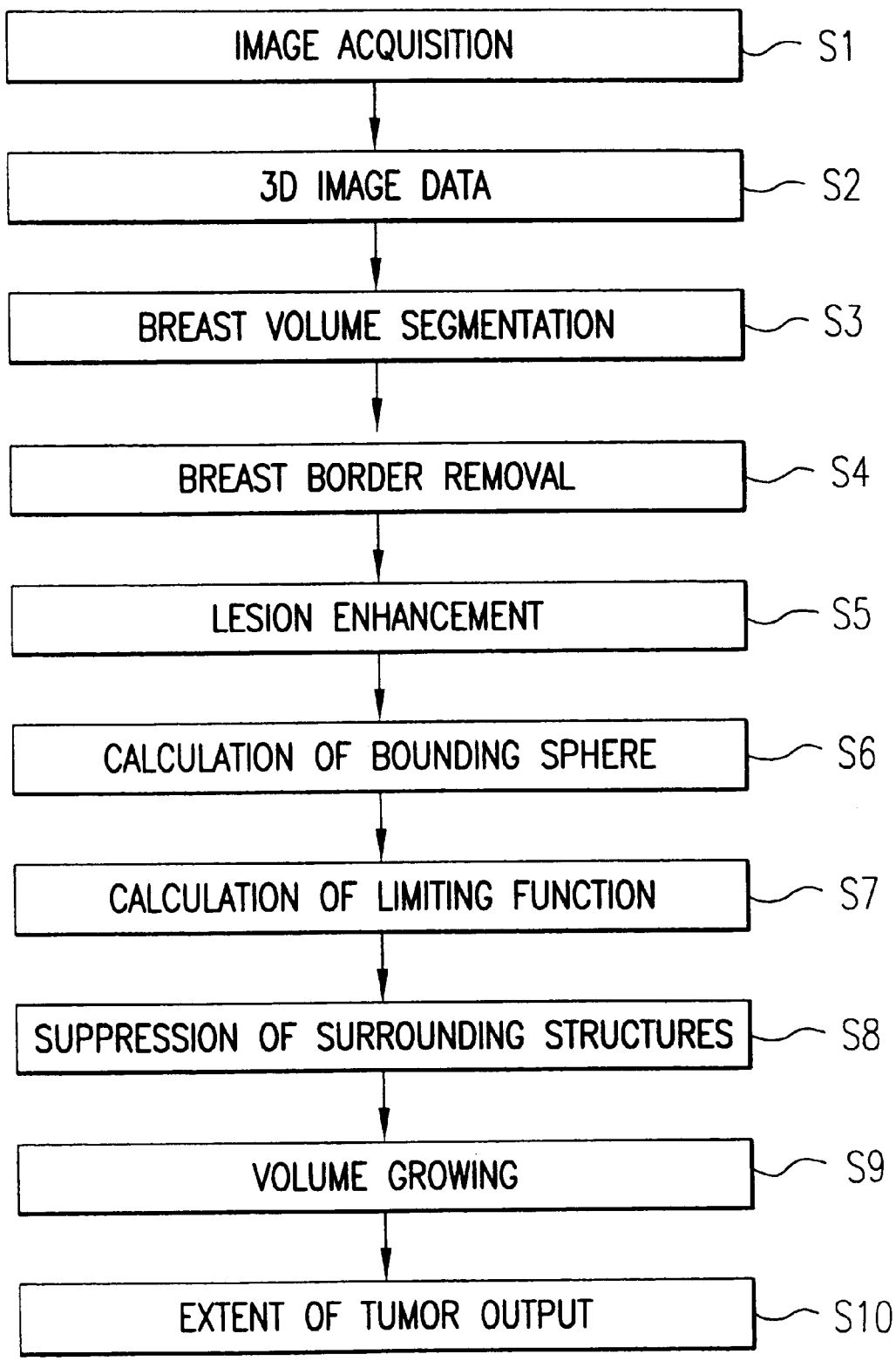
FIG. 1 is a flowchart describing the overall method for the automated assessment of tumor extent in MRI images, which consists of seven stages: breast volume segmentation, breast border removal, lesion enhancement, determination of the bounding sphere, computation of a 3-D search volume, suppression of surrounding structures, and volume growing (for the assessment of tumor extent, the lesion location, in terms of estimated center, is determined by either a human or computerized detection method and input; this input is referred to as the seed point)

Referring now to the drawings, and more particularly to FIG. 1 thereof, a flowchart for the automated method for the assessment of tumor extent in MR images is shown. In step SI a set of 2-D MR images that include a volume are acquired. Then, in step S2 a 3-D representation representation of the volume is generated from the 2-D images. The lesion location, in terms of the estimated center of the lesion within the volume, is input from either a human or a computer. The estimated center that is input is referred to as the seed point. The remaining steps of the image analysis scheme include breast volume segmentation in step S3, breast border removal in step S4, lesion enhancement in step S5, determination of the bounding sphere in step S6, determination of a 3-D search volume in step S7, suppression of surrounding structures in step S8, volume growing in step S9, and generating and outputting the extent of the tumor in step S10. The entire image analysis scheme is described in greater detail below.

Database

Figure 2:
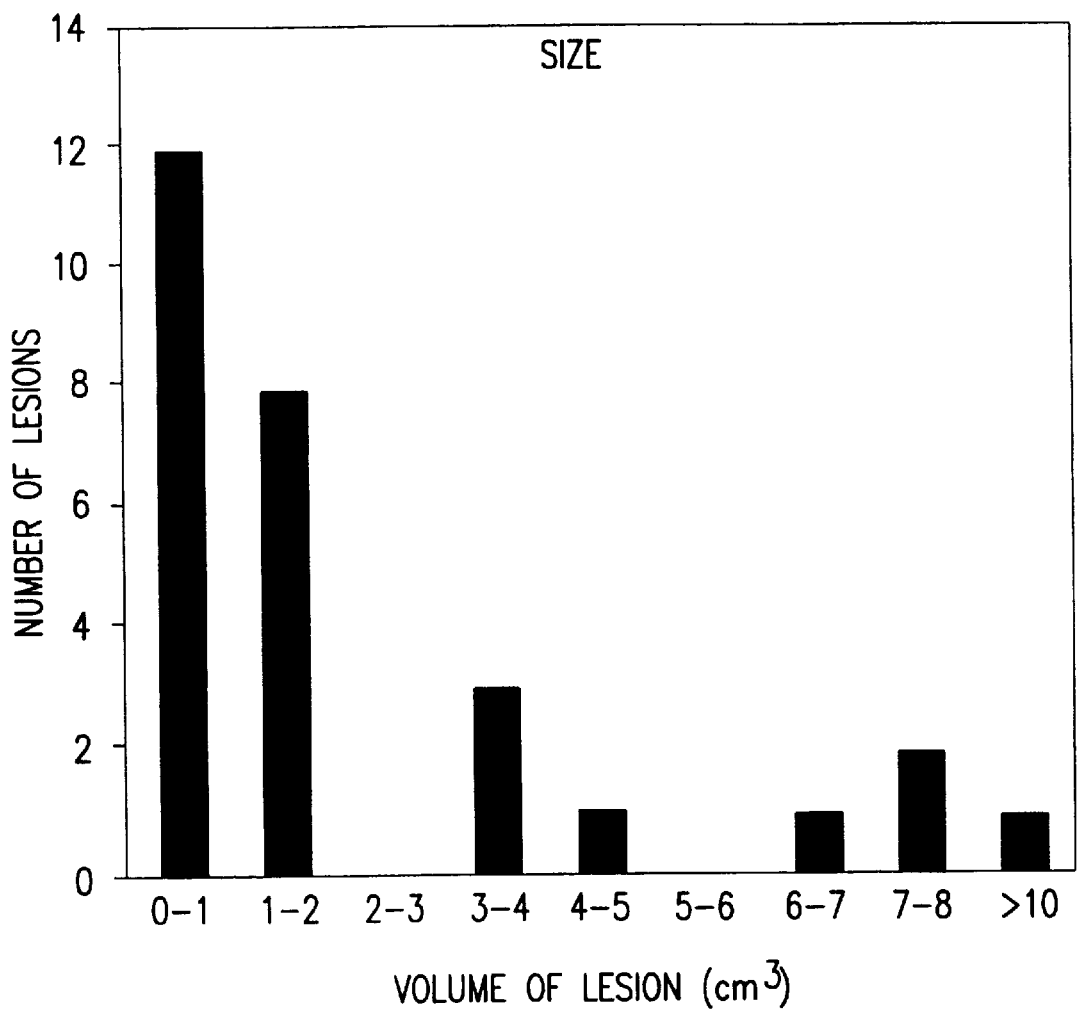
FIG. 2 is a graph showing the distribution of tumor sizes in the database used in the demonstration and evaluation of the invention.
Figure 3:
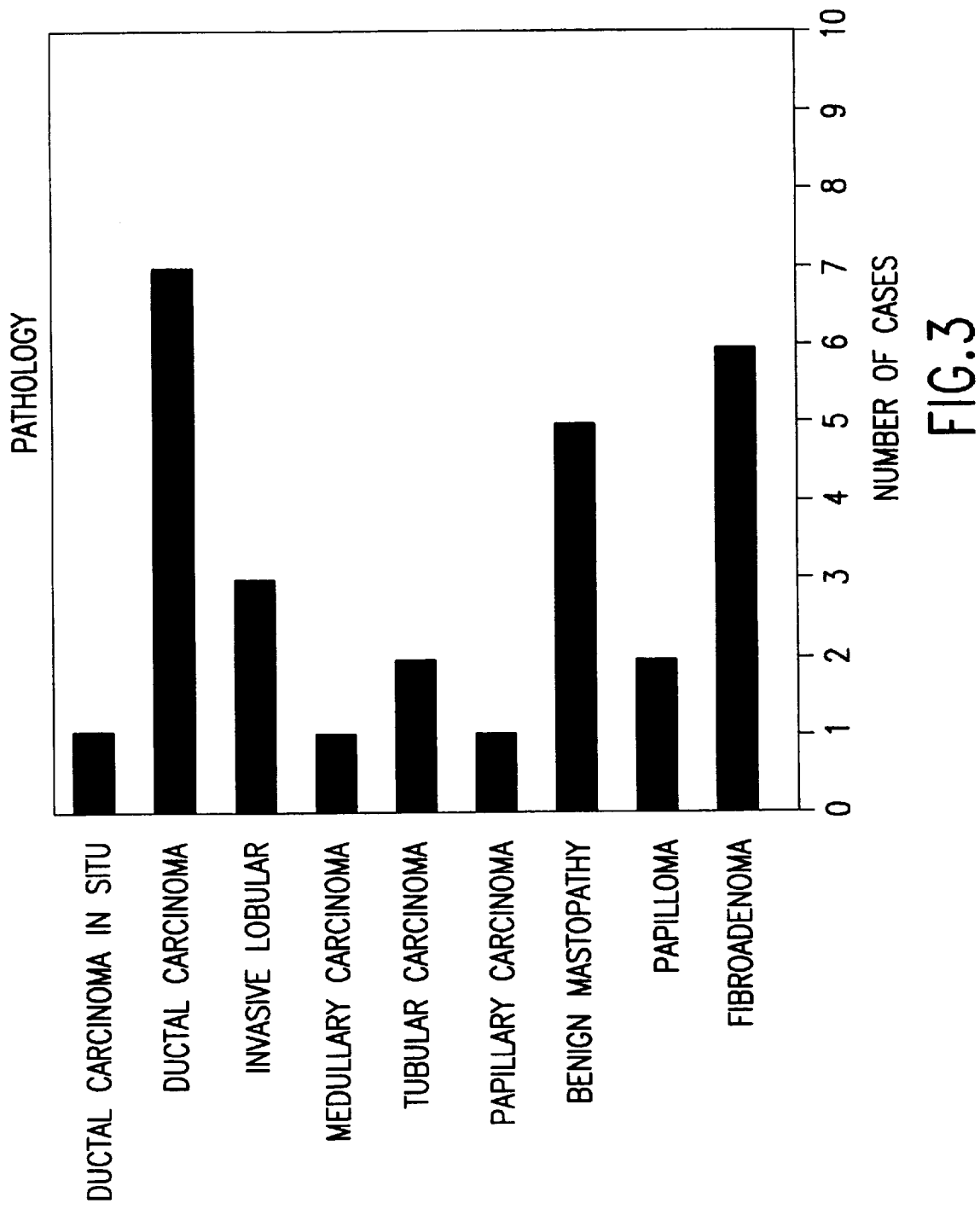
FIG. 3 is a graph showing the distribution of tumor pathology in the database used in the demonstration and evaluation of the invention.
Figure 4A:
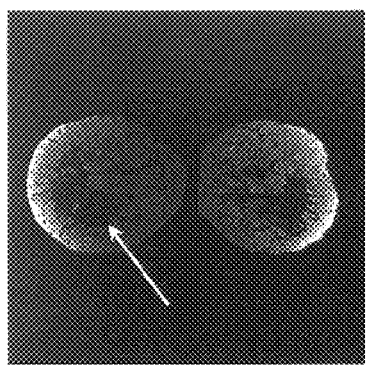
FIGS. 4(a), 4(b), 4(c), and 4(d) are illustrative images of the cross sections of two breasts (left and right) at four MR acquisition times, respectively, where the time of 0 seconds refers to the pre-contrast image and a lesion is apparent in the left breast.
Figure 4B:
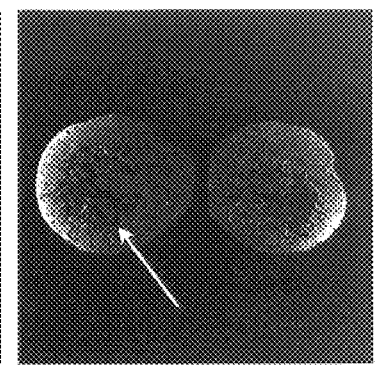
Figure 4C:
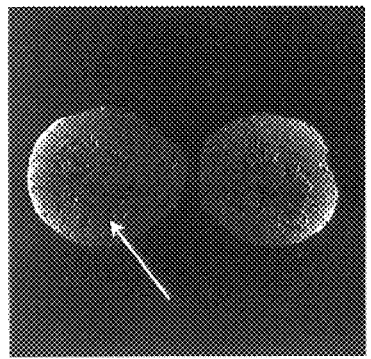
Figure 4D:
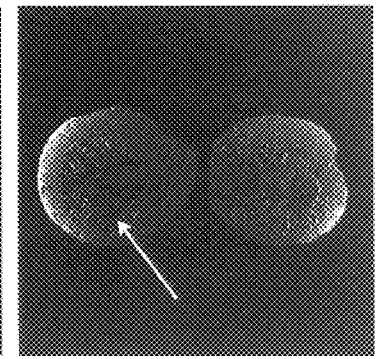

The images in this study were obtained by 3-D FLASH acquisition. A Gd-DTPA contrast agent was administered after acquisition of the precontrast volume. At least 3 postcontrast volumes were obtained at 90 second intervals. Each volume consists of 64 slices of 256×256 pixels. The pixel size is 1.25×1.25 mm$^2$, and the typical slice thickness is 2.0 mm. The database consists of 13 benign and 15 malignant lesions from 27 patients. The size of the lesions varies from 0.1 cm$^3$ to 17 cm$^3$. As shown in FIG. 2, most of the lesions in the database (twenty out of twenty-eight) have volumes less than 2 cm$^3$. Referring to FIG. 3, pathology included fibroadenoma in six out of the twenty-eight lesions, papilloma in two out of the twenty-eight legions, benign mastopathy in five out of the twenty-eight lesions, ductal carcinoma in situ (DCIS) in one out of the twenty-eight lesions, papillary carcinoma in one out of the twenty-eight lesions, tubular carcinoma in two out of the twenty-eight lesions, medullary carcinoma in one out of the twenty-eight lesions, invasive lobular carcinoma in three out of the twenty-eight lesions, and ductal carcinoma in seven out of twenty-eight of the lesions. All lesions were unifocal, some diffuse in appearance. Examples of cross section images of a malignant lesion in a contrast-enhanced MRI image are shown in FIGS. 4(a), 4(b), 4(c), and 4(d). Note that the images contain cross sections through both the left and right breasts. The lesion (tumor) is in the left breast and is the result of invasive ductal cancer.

Computerized segmentation and assessment of tumor extent

Referring back to FIG. 1, the computerized segmentation of the breast lesions includes: breast volume segmentation in step S3, breast border removal in step S4, lesion enhancement in step S5, determination of the bounding sphere in step S6, determination of a 3-D search volume in step S7, suppression of surrounding structures in step S8, and volume growing in step S9. As noted above, the lesion location in terms of estimated center is input from either a human or computer, and is referred to as the seed point.

Figure 5A:
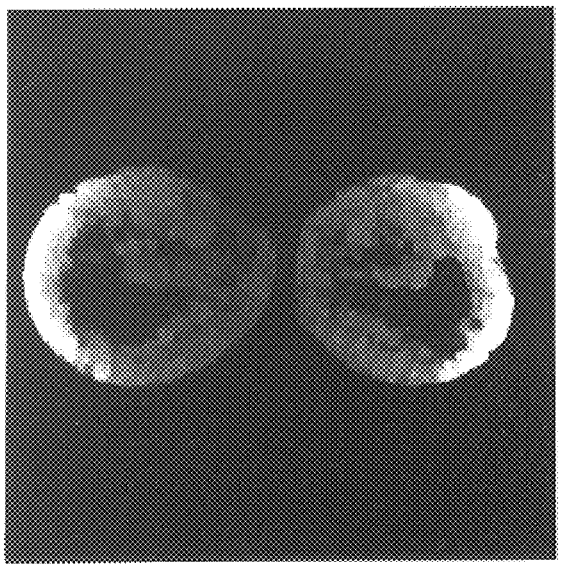
FIGS. 5(a), 5(b), 5(c), and 5(d) are images illustrating the results at various stages of breast volume segmentation, including respectively, (a) preprocessing with 3×3×3 morphological processing, (b) segmentation using maximization of the interclass variance, (c) contour tracing and filling for gap removal, and (d) the segmented breast volume in 3-D presentation.
Figure 5B:
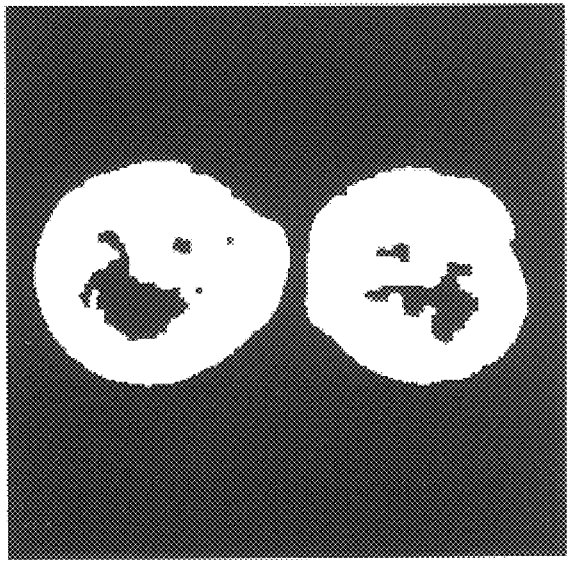
Figure 5C:
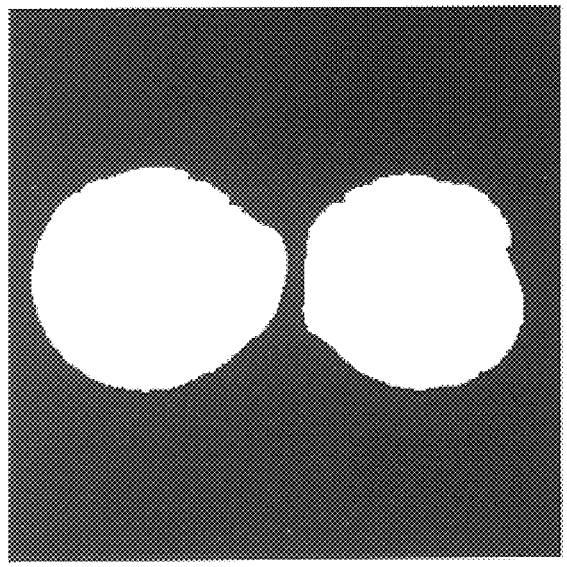
Figure 5D:
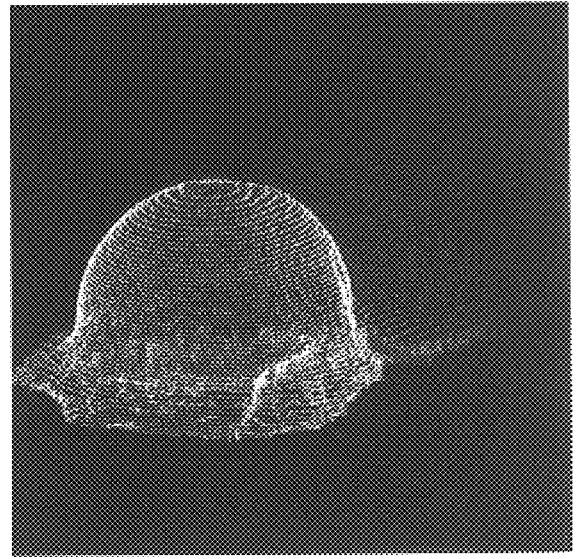
Figure 5E:
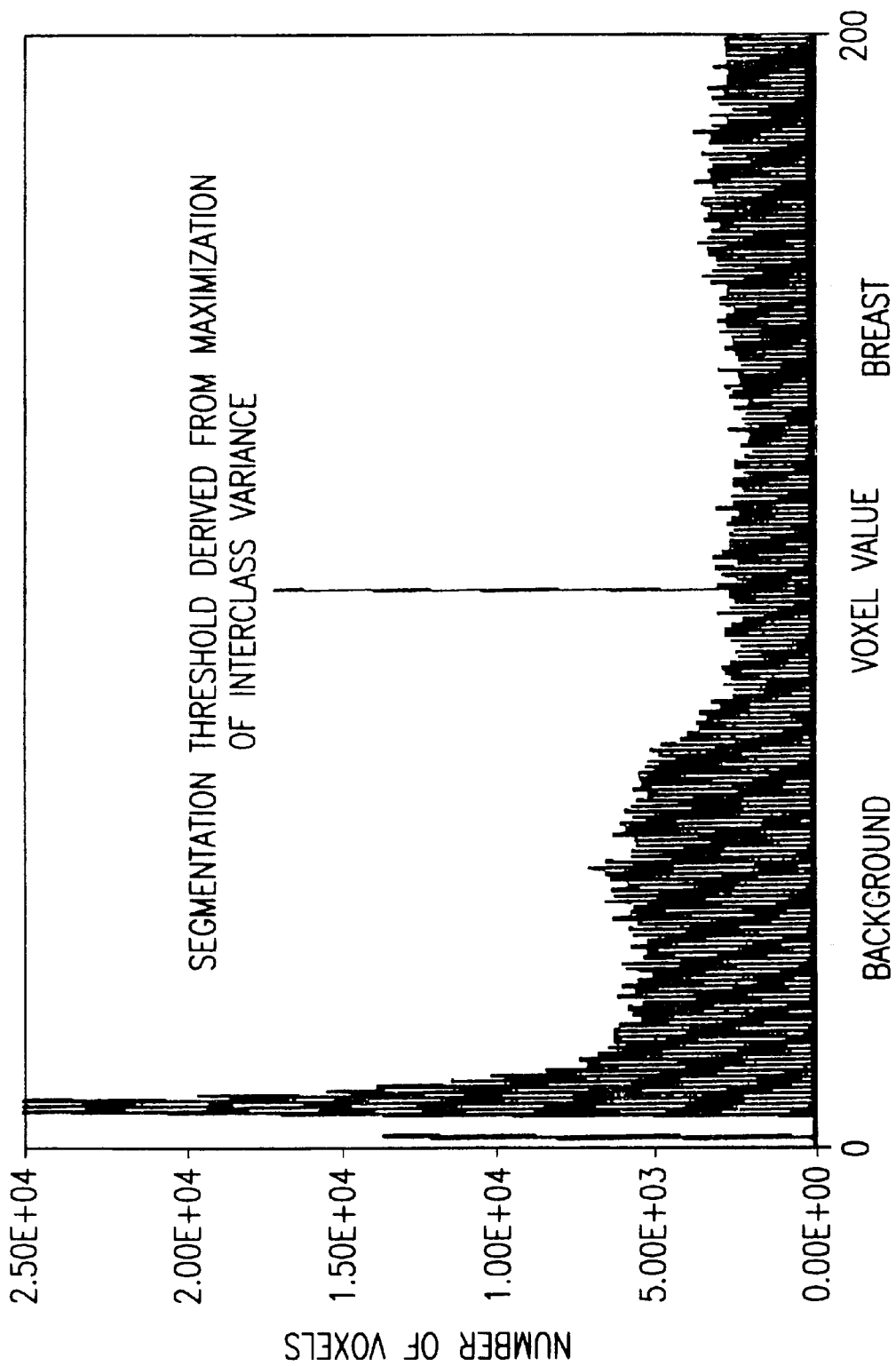
FIG. 5(e) is a gray level histogram used in determining the gray level threshold that maximizes the variance between two classes, here, background voxels and breast voxels.

In step S3, the breast volume is segmented from the rest of the image data as shown in FIGS. 5(a), 5(b), 5(c), and 5(d). The precontrast volume data are processed by 3-D morphological opening (dilation followed by erosion) and closing (erosion followed by dilation) using a structuring element (kernel) of 3×3×3 voxels (FIG. 5(a)). This processing is employed to remove small gaps (holes) and spikes from the data. Next, the preprocessed volume is segmented at a threshold derived from the global histogram of voxel values by maximization of the inter-class variance [Otsu, 1997] between breast and background voxels (FIG. 5(b)). That is, given that there are two classes (breast voxels and background voxels), the gray level threshold is set at the gray level that separates the classes such that the variance between the classes is maximized. In this maximization, values from the gray level histogram (FIG. 5(e)) of the entire 3-D image are used in calculating the interclass variance. Finally, gaps in the segmented breast region, which are caused by breast tissue that corresponds to low MR signals, are removed by a sequence of contour tracing and region filling (FIG. 5(c)). It should be noted that step S3 can be performed on either pre or post contrast MR volume data. FIG. 5(d) illustrates the contour of the final segmented breast volume.

Figure 6A:
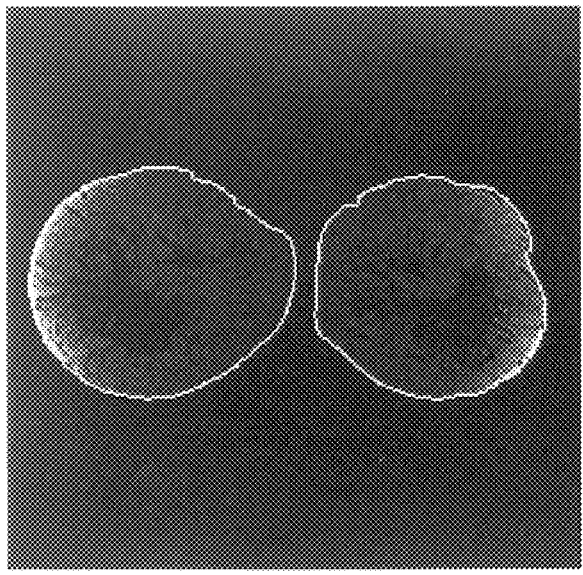
FIGS. 6(a) and 6(b) are images illustrating the method for the removal of the breast border (i.e., the skin) from the volume of interest for subsequent analyses, including respectively, (a) the segmented borders overlaid on the precontrast image data, and (b) the remaining volume of interest after a 3×3×3 erosion operation along the 3-D breast border data.
Figure 6B:
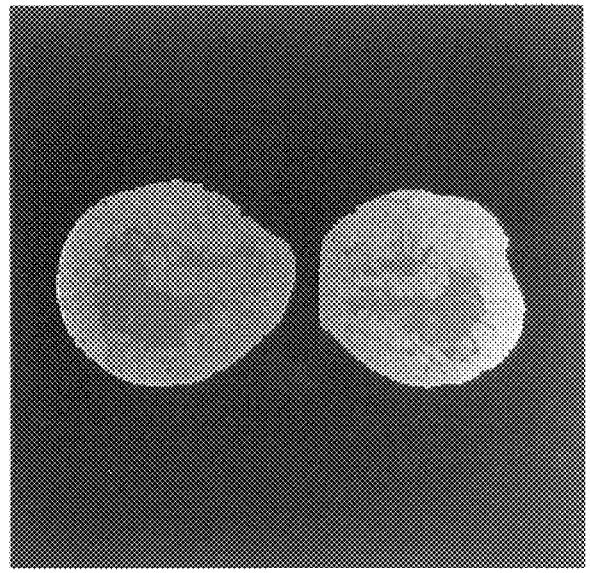

In step S4 the border of the segmented breast volume is removed by morphological erosion along the contour of the breasts as determined in step S5. FIG. 6(a) shows the borders of the breasts (determined in step S3) overlaid on the precontrast image data. Erosion is performed along this border with a structuring element, e.g., a 3×3×3 structuring element. The border is removed to prevent the skin's uptake of the contrast agent from affecting the subsequent segmentation of lesions close to the skin. Therefore, the size of the structuring element preferably varies in proportion to the thickness of the skin in real coordinates. FIG. 6(b) shows the breast section after removal of the breast borders. The resulting binary volume is used as a mask in which subsequent calculations are performed. That is, the subsequent calculations are only performed within the remaining breast volume data (i.e., without the breast borders).

In step S5, regions that exhibit a relatively high uptake of the contrast agent are enhanced by assigning the variance of the uptake values over time to each individual voxel. The processed image (volume data), P(r), is given by $$P(r)=\{\Sigma_i[F(r,i)-<F(r)>]^2\}/(N-1),$$

where F(r,i) denotes the voxel value at position (vector) r and time frame i (where there are N time frames) prior to this variance processing and <F(r)> denotes the average voxel value over time at position r. Optionally, the calculation of the variance of the uptake values over time can be weighted by the sequence of number of the acquisition, as given by $$P(r)=\{\Sigma_i\{[F(r,i)-<F(r)>]^2/i\}\}/(N-1).$$

Figure 7A:
FIGS. 7(a) and 7(b) are images illustrative of the resulting image data after lesion enhancement using, respectively, either (a) the variance or (b) the time-weighted variance processing methods.
Figure 7B:
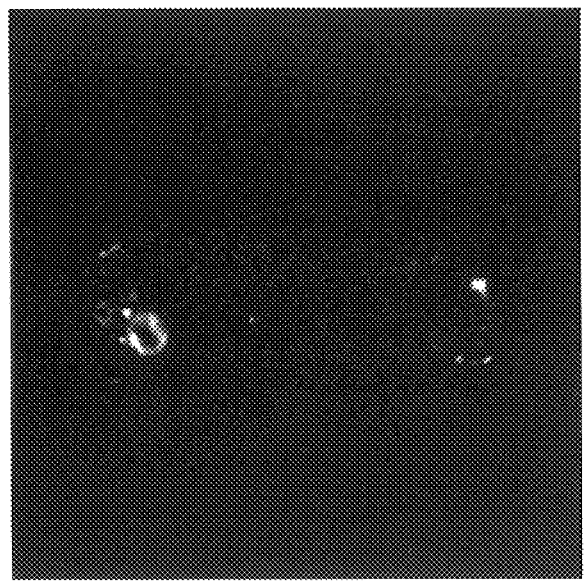

Using the time-weighted procedure, regions that exhibit high uptake of the contrast agent in earlier time sequences (a property commonly associated with lesions) are assigned higher values in the enhanced image than regions that correspond with slower uptake of contrast. FIG. 7(a) is an image illustrating the results of the variance method for lesion enhancement, and FIG. 7(b) is an image illustrating the results of the time-weighted variance method for lesion enhancement. After enhancement, the volume data are smoothed with a 3×3×3 uniform filter for further processing in the subsequent stages. Note that the processed image generated in step S5 may also called the variance image.

Figure 8A:
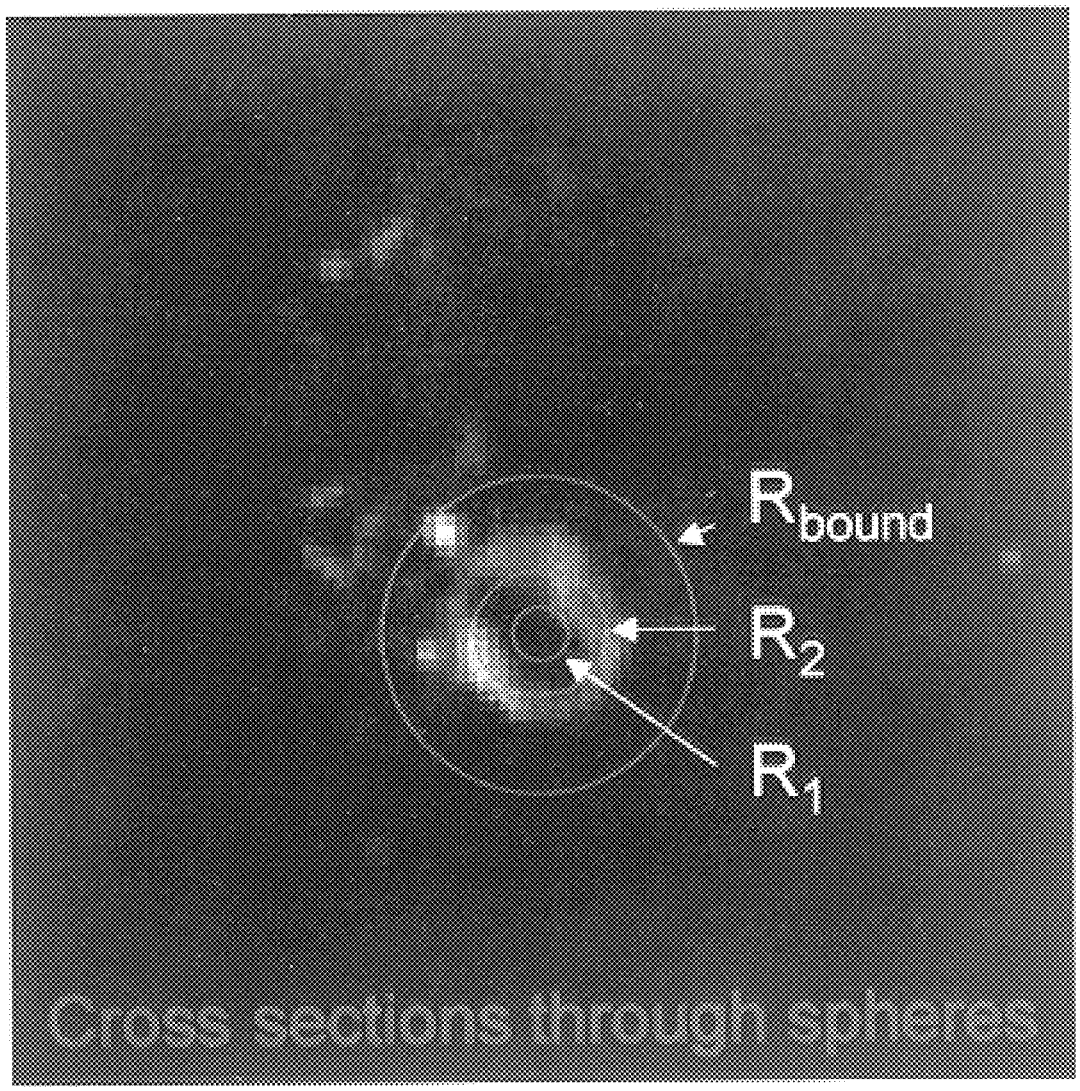
FIG. 8(a) is an image of a seed point.
Figure 8B:
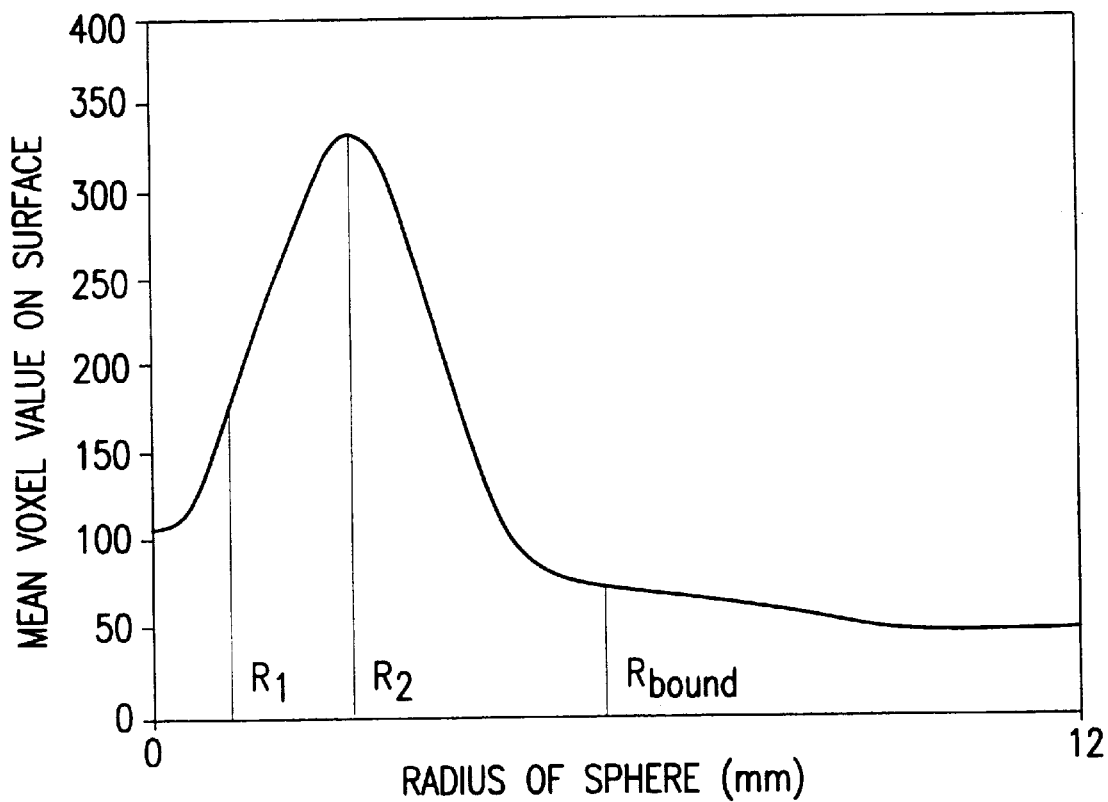
FIG. 8(b) is a graph of the resulting function when the mean of the voxel values on the surface of a sphere which is centered in the seed point in FIG. 8(a) is computed as the function of the radius of the sphere and low-pass filtered.

In step S6 a bounding sphere for roughly limiting the subsequent volume growing of the tumor is determined as follows. The mean of the values of the voxels that intersect the surface of a sphere, which is overlaid on the enhanced image data (generated in step S5) and centered in the seed point, is computed as a function of the radius of the sphere. This function, after application of low-pass filtering to capture the low frequency trend, shall be referred to as the expansion function. FIG. 8(b) shows an example of the expansion function for a malignant lesion with a necrotic core. The radius $R_{bound}$ corresponds to the radius of the sphere that closely encompasses the uptake region of the lesion. This sphere shall be referred to as the bounding sphere. Radius $R_{bound}$ corresponds to the first point where the derivative of the expansion function reaches zero after crossing the global maximum. As shown in FIG. 8(a), if the center of the tumor is necrotic, the function will usually rise and then decrease, indicating slower uptake of the contrast agent in the middle of the tumor. If the center of the tumor contains live cells, then the function will start high and level for a short distance, and then decrease, indicating a faster uptake of the contrast agent in the middle of the tumor. The inner, middle, and outer circles in FIG. 8(a) correspond to radii $R_1$, $R_2$, and $R_{bound}$ of the sphere, respectively. The radius $R_{bound}$ provides a conservative estimate of the extent of the tumor. Further, $R_{bound}$ could be used to analyze tumor growth/shrinkage in a patient over time. A more detailed estimate of the tumor extent is obtained by additionally performing steps S7–S9 described below.

In step S7, the limiting search function for eventual volume growing is obtained as follows. A binary image representation of the bounding sphere is initially obtained. As an option, a smoothed version of the binary image representation of the bounding sphere is obtained by means of a triangular smoothing filter. The triangular smoothing filter is implemented as the convolution of two cubes, resulting in the a function that includes the bounding sphere (white) and a gray area surrounding the bounding sphere (gray). FIG. 9(b) illustrates the constraint friction when determined from the bounding sphere by convolution with a triangular smoothing filter (i.e., convolution with two cubes).

Figure 9A:
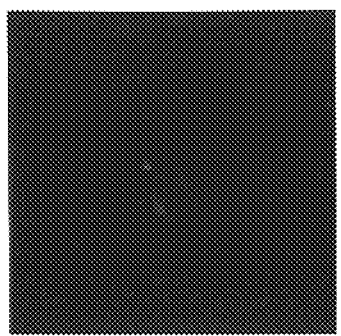
FIGS. 9(a), 9(b), and 9(c) are images demonstrating the suppression of surrounding structures, including respectively, (a) the enhanced volume data, (b) the limited search volume, and (c) the resulting volume with the surrounding structures suppressed.
Figure 9B:
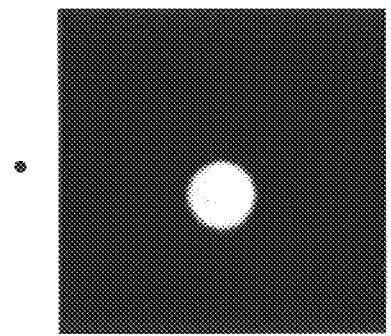
Figure 9C:
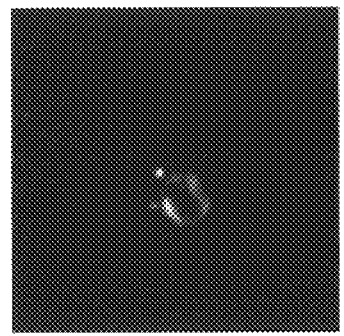

In step S8, details outside the bounding sphere are suppressed by multiplication of the variance-processed volume (i.e., the variance image determined in step 5 and shown in FIG. 9(a)) with the limiting search function (FIG. 9(b)). The resulting volume is referred to as the target volume, since this volume may be sufficient for radiation treatment planning or surgical treatment planning. FIG. 9(c) illustrates the target volume obtained by the multiplication (voxel by voxel) of the data from FIG. 9(a) and FIG. 9(b). The target volume defines the limits of search for the final volume growing in which a more detailed quantification of the tumor surface is obtained (see step S9 below). The multiplication used to determine the target volume also suppresses spurious details outside the tumor. Since the triangle smoothing was used on the binary representation of the bounding sphere, the target volume represents the area of the variance image corresponding to the bounding sphere and the area of the variance image corresponding to the area within the vicinity of the sphere weighted according to the triangular smoothing function. Note that if the triangular smoothing filter had not been used on the binary image representation of the bounding sphere, volume data beyond $R_{bound}$ (centered on the seed point) would just be excluded from subsequent analyses.

In Step S9 volume growing is performed. A gray value threshold to terminate volume growing is determined by maximizing the interclass variance [Otsu, 1997] between lesion and background voxels in the volume of interest encompassed by the bounding sphere, i.e., in the target volume. That is, given that there are two classes (lesion voxels and background voxels), the gray level threshold is set at the gray level that separates the classes such that the variance between the classes is maximized, based on a gray level histogram of all of the voxels in the volume of interest.

Figure 10A:
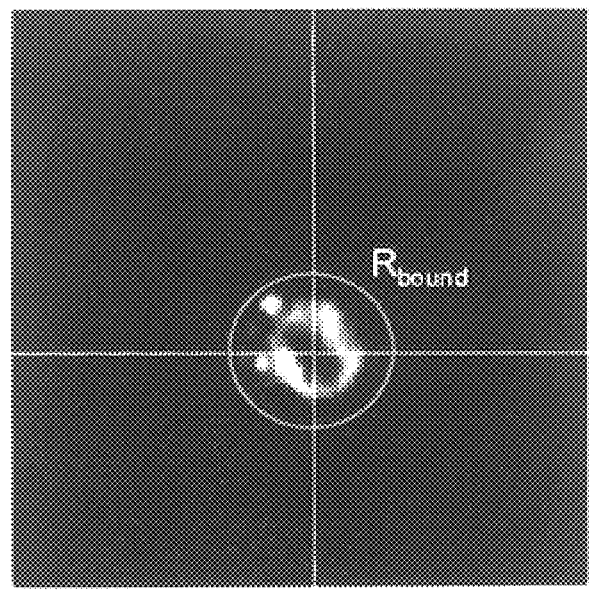
FIGS. 10(a) and 10(b) are, respectively, images of (a) an initial seed point and (b) a modified seed point, for illustrating the shifting of the seed point in the x, y, and z directions.
Figure 10B:
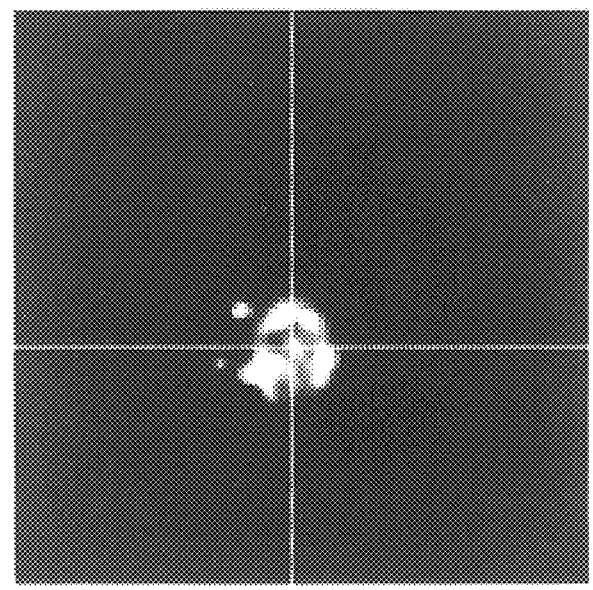
Figure 10C:
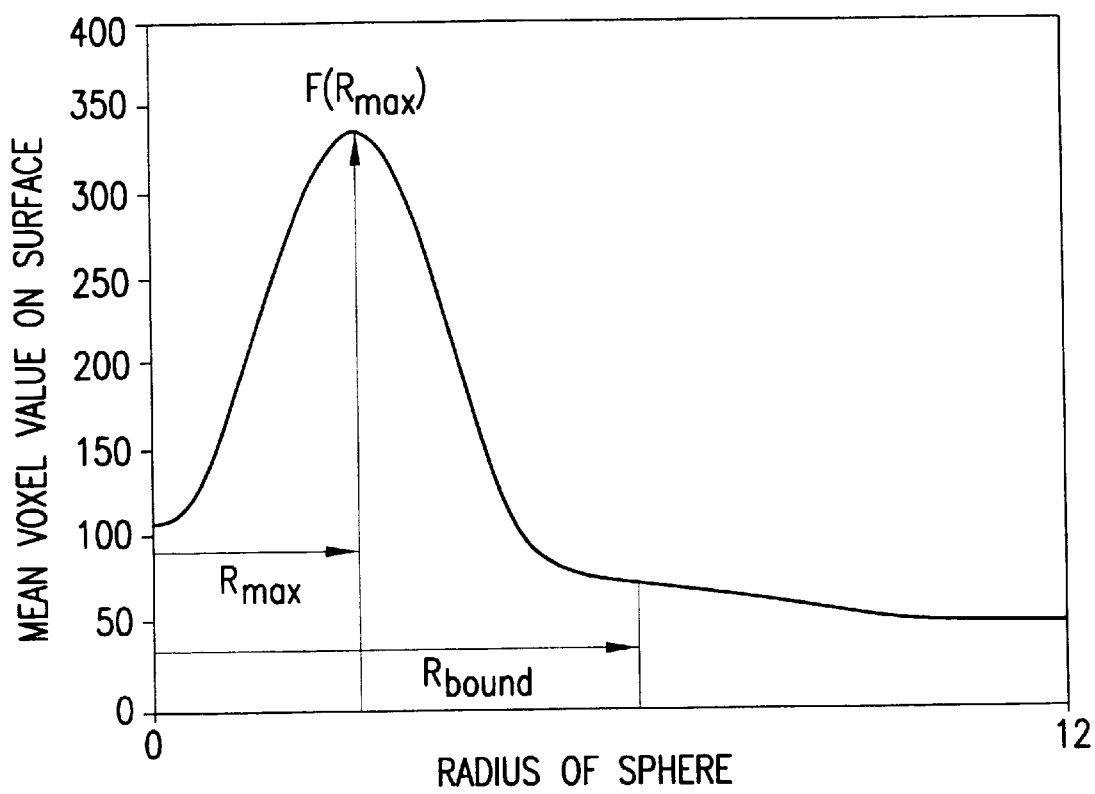
FIG. 10(c) is a graph showing the method for assessment of tumor extent including the volume growing of the tumor in which the stopping criterion (to determine the gray level for final volume growing) is derived from the maximization of the interclass voxel variance between the tumor and the surrounding structures.

The gray level to be used in the subsequent volume growing is the level where the interclass voxel variance within $R_{bound}$ is maximized at a given gray level threshold. Next, the user indicated seed point is shifted to the nearest point in 3-D that has a voxel value larger or equal to the global maximum in the expansion function. The expansion function (shown in FIG. 10(c) indicates the mean voxel value along the surface as a function of radius from the initial seed point. The nearest voxel to the initial seed point having a voxel value (i.e., gray value) of that corresponding to that at the radius $R_{max}$ becomes the new seed point. This step is required to minimize the effect of inter- and intra-observer variations in indication of the seed point and to allow successful volume growing of lesions with seed points placed in necrotic centers (so that volume growing does not begin in the necrotic center). FIG. 10(a) illustrates the tumor with the original seed point, and FIG. 10(b) illustrates the tumor with the seed point shifted in the x, y, and z directions. The modified seed point is determined by shifting the seed point to the voxel with value greater or equal to $F(R_{max})$ at distance $R_{max}$ (in three-dimensions) from the initial seed point. Note that due to the shift in z-direction (i.e., to another cross section), the necrotic center is not seen. Next, the extent of the tumor is obtained by 6-connected volume growing in the target volume, based on the gray level threshold determined in the earlier interclass variance calculation (between background and tumor) and starting from the adjusted seed point. Six-connected volume growing proceeds as follows: starting at the seed point, determine whether any of the six voxels on the surface of the seed point voxel are above the gray level threshold; connect each voxel on the surface of the seed point that has a gray level higher than the gray level threshold; repeat for each connected voxel. Then, in step S10 the extent of the tumor determined in step S9 is output visually, as shown in FIG. 11(a).

Evaluation

To serve as reference in the evaluation of the computerized segmentation method, the lesions were also manually segmented in each slice by a well-trained MR radiologist. This segmentation was performed in the subtraction images (postcontrast−precontrast) by indicating the enhanced tumor area in each slice that intersected the lesion. All available subtraction images were used for this purpose. As additional reference, the radiologist used the original (non-subtracted) MR images, and complementary information from other modalities in case of doubt.

Figure 11A:
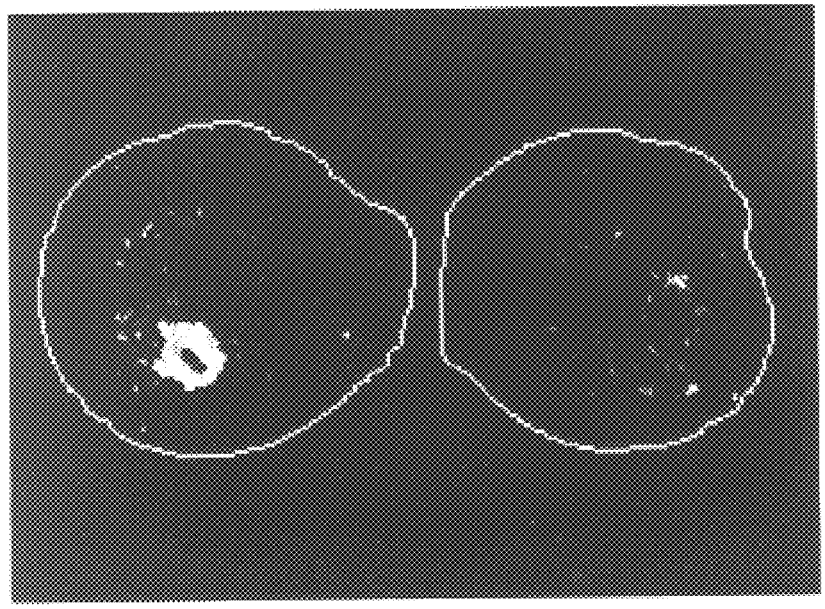
FIGS. 11(a) and 11(b) are images illustrating, respectively, (a) the computer output indicating the grown volume using the time-weighted variance processing and (b) the "truth" as indicated by an experienced MR radiologist.
Figure 11B:
Figure 12A:
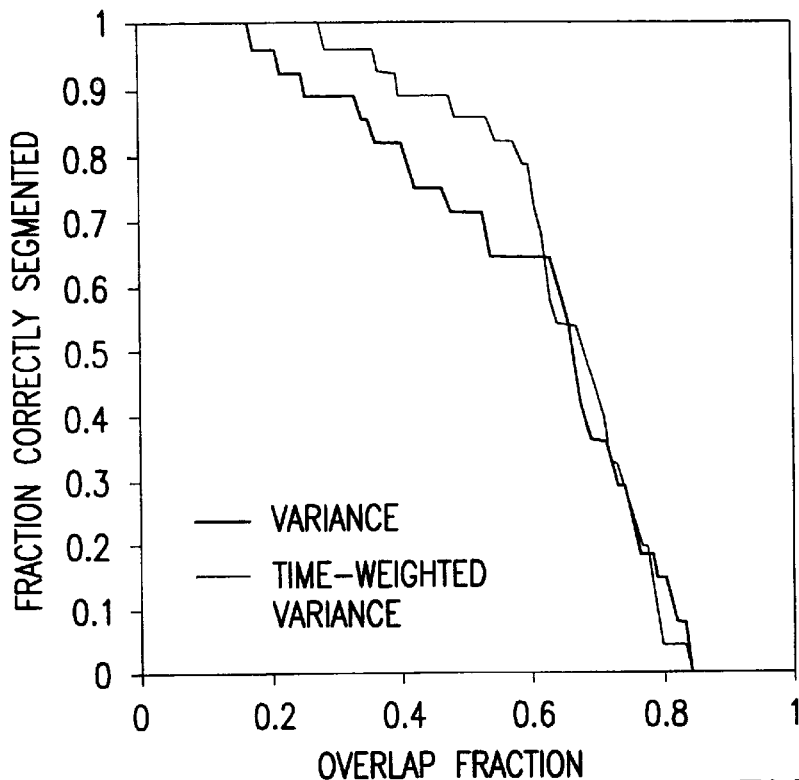
FIGS. 12(a) and 12(b) are graphs illustrating the performance of the variance and the time-weighted variance processing on assessing tumor extent in terms of, respectively, (a) overlap with the radiologist assessment of the tumor extent and (b) rms distances from the radiologist assessment of tumor extent.

FIG. 11(a) is a computer output image indicating the grown volume using the time-weighted variance processing. FIG. 11(b) is an image showing the "truth" as indicated by an experienced MR radiologist. The agreement between the results of the computerized segmentation and the well-trained MR radiologist was objectively evaluated by overlap measures and by metric measures. The overlap measure is defined as:

(A∩B)/(A∪B), where A in this study denotes the set of voxels in the result of the computerized segmentation determination of tumor extent, and B denotes the set of voxels in the result of the reference segmentation (segmentation performed by radiologist). FIG. 12(a) shows the performance of the variance and the time-weighted variance processing on assessing tumor extent in terms of overlap with the radiologist assessment of the tumor extent. The mean overlap in 3-D between the results of the computerized segmentation and the results of the radiologist was found to be 0.66±0.14 (standard deviation). The overlap measure has a tendency to penalize deviations in contours extracted from small lesions more than it penalizes similar deviations in contours extracted from larger lesions. This problem was not observed in metric measures of similarity, as shown below.

Figure 12B:
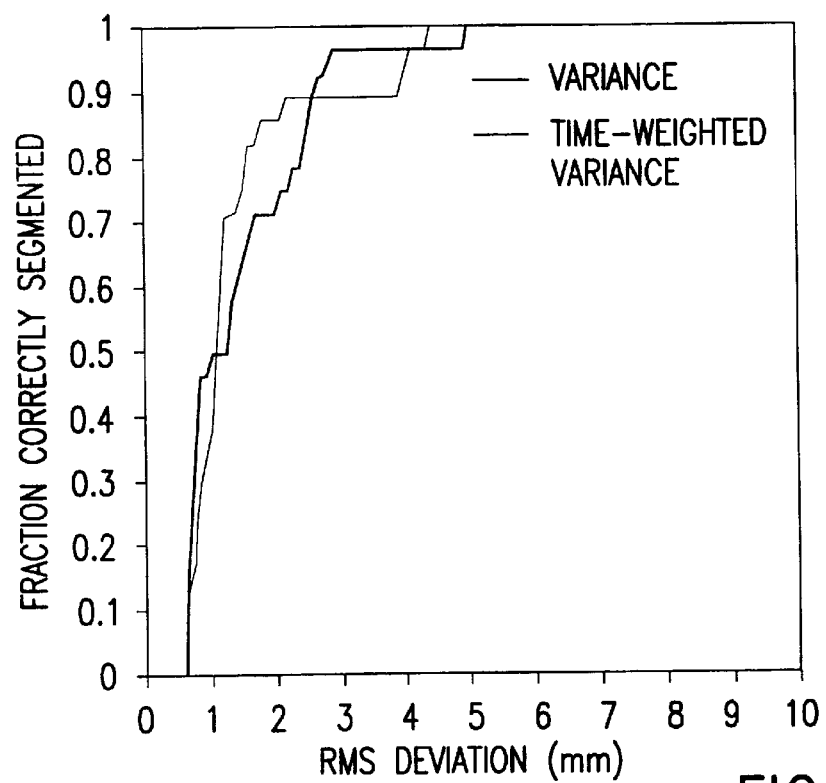

The metric measures of performance are based on the nearest distances in 3-D between the contour points of the computerized segmentation and those of the reference segmentation. FIG. 12(b) shows the performance of the variance and time-weighted variance processing on assessing tumor extent in terms of rms distances from the radiologist assessment of tumor extent. The significance of difference in the results obtained by the computerized method and by the well-trained radiologist was calculated by a two-tailed student test at confidence interval of 95%, given the hypothesized mean deviation of zero between the position of the nearest contour points in 3-D. The mean of the rms distances in 3-D between the nearest contour points per lesion was found to be 1.3 mm±1.0 mm (standard deviation). The method showed no significant difference in performance compared with the well-trained radiologist (p>0.5).

Discussion

This present invention provides a method for consistent, computerized segmentation of breast lesions and quantitation of tumor extent in 3-D from contrast-enhanced MR data. The method requires selection of only a single point inside the lesion, which can be done by either human or computer. Inhomogeneity of the magnetic field may cause low frequency variations in image intensity in the MR data, in particular near the borders of the breast. To minimize the effect of these variations on the result of the segmentation, the stop criterion for volume growing is computed only in a volume of interest encompassed by the bounding sphere. Patient motion during acquisition of the MR data may cause artifacts in the enhancement. The average patient motion in this study is estimated to be 2 mm. Since the pixel size is 1.25 mm, the motion mostly caused additional blurring rather than actual displacement of image structures. Image registration to align the breast volumes in the images obtained at the different time frames may further improve the accuracy of the performance.

It should be noted that although the method is presented on 3-D image data sets, the variance processing can be performed on 2-D image data sets obtained over time. Such images (slices) are obtained from the MR images of the breast.

It should also be noted that although the method is presented for MR images of the breast, the application can be performed on MR images of tumors elsewhere in the body. The uptake of the contrast agent would still be increased by the increased vascularity of the tumor.

It should also be noted that although the method is presented for MR images, the techniques can be applied on other 2-D or 3-D image sets acquired over time, thus allowing for calculation of variance processing.

It should also be noted that although the above discussion relates primarily to the initial identification of a seed point for the volume growing and the assessment of tumor extent, the presented method can also be used for the computerized detection of lesions (tumors) within volume images of the breast. The computerized detection of lesions (tumors) within volume images of the breast is performed by iteratively performing the volume growing and subsequent assessment of tumor extent at all regions of high uptake that result from the variance or time-weighted variance enhancement. As shown in FIG. 13, regions exhibiting high uptake are identified in step S5 and in step S12 tumors (lesions are detected).

To detect tumors, thresholding is performed on the variance image data to detect one or more seed points were volume growing will be initiated. The seed points correspond to detected tumors. The thresholding may be performed by identifying voxels with a higher value than that of other voxels. Alternatively, seed point voxels can be determined by identifying the center voxel (i.e., the centroid) in groups (clusters) of contiguous voxels having values above the threshold value. Volume growing (described above) may be initiated from one or more of the identified seed points to determine the extent of the identified tumors. In the event that a seed point does not have a value greater than the threshold, volume growing can start from that voxel closest to the seed point and having a value exceeding the threshold to terminate volume growing in the volume growing target region.

Figure 14:
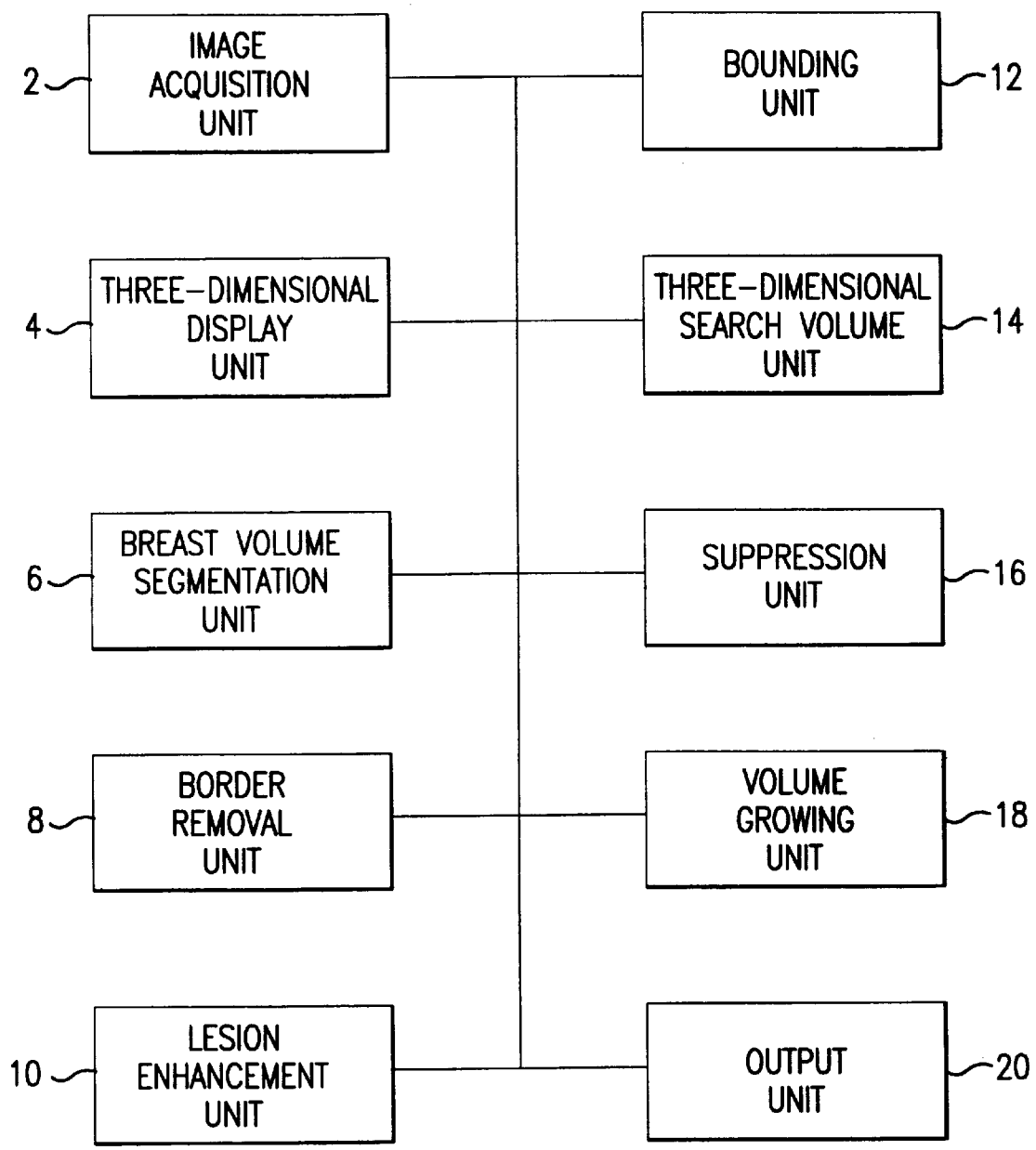
FIG. 14 is a block diagram of a system for performing the computerized assessment of tumor extent in MR images of the breast in accordance with the present invention.

FIG. 14 is a block diagram of a system for the automated assessment of tumor extent in MR images of the breast. The system of FIG. 14 is configured to perform any of Steps S1 through S12, as described above in conjunction with FIGS. 1 and 13. An image acquisition unit 2 acquires breast images and converts the breast images into digital images. The image acquisition unit 2 may also acquire digital images, eliminating the need to convert the images into a digital format. A breast volume segmentation unit 6 performs breast volume segmentation on the images obtained by the image acquisition unit, and a border removal unit 8 performs breast border removal based on data generated by the volume segmentation unit 6. A lesion enhancement unit 10 performs lesion enhancement for image data generated by the volume segmentation unit 6. A bounding unit 12 determines a bounding sphere based on the image data generated by the lesion enhancement unit 10, and a three-dimensional search volume unit 14 determines a three-dimensional search volume within the image data generated by the bounding unit 12. A suppression unit 16 suppresses surrounding structures in the image data generated by the three-dimensional search unit. A volume growing unit 18 performs volume growing based on the image data generated by the suppression unit 16, and an output unit 20 generates a final set of image data based on the image data generated by the volume growing unit 18. The output unit may also generate additional data, including statistical data for any of the image data acquired, or generated by, the system, information representative of whether tumors were detected, and/or information representative of the extent of the tumors. As noted above, the lesion location in terms of estimated center is input from either a human or computer, and is referred to as the seed point. A three-dimensional display unit 4 generates image data corresponding to a three-dimensional representation of the breast images acquired by the image acquisition unit 2 and displays data, including two- and three-dimensional digital images generated by any element of the system, including the image acquisition unit 2, a breast volume segmentation unit 6, a border removal unit 8, a lesion enhancement unit 10, a bounding unit 12, a three-dimensional search volume unit 14, a suppression unit 16, a volume growing unit 18, and an output unit 20.

Figure 15:
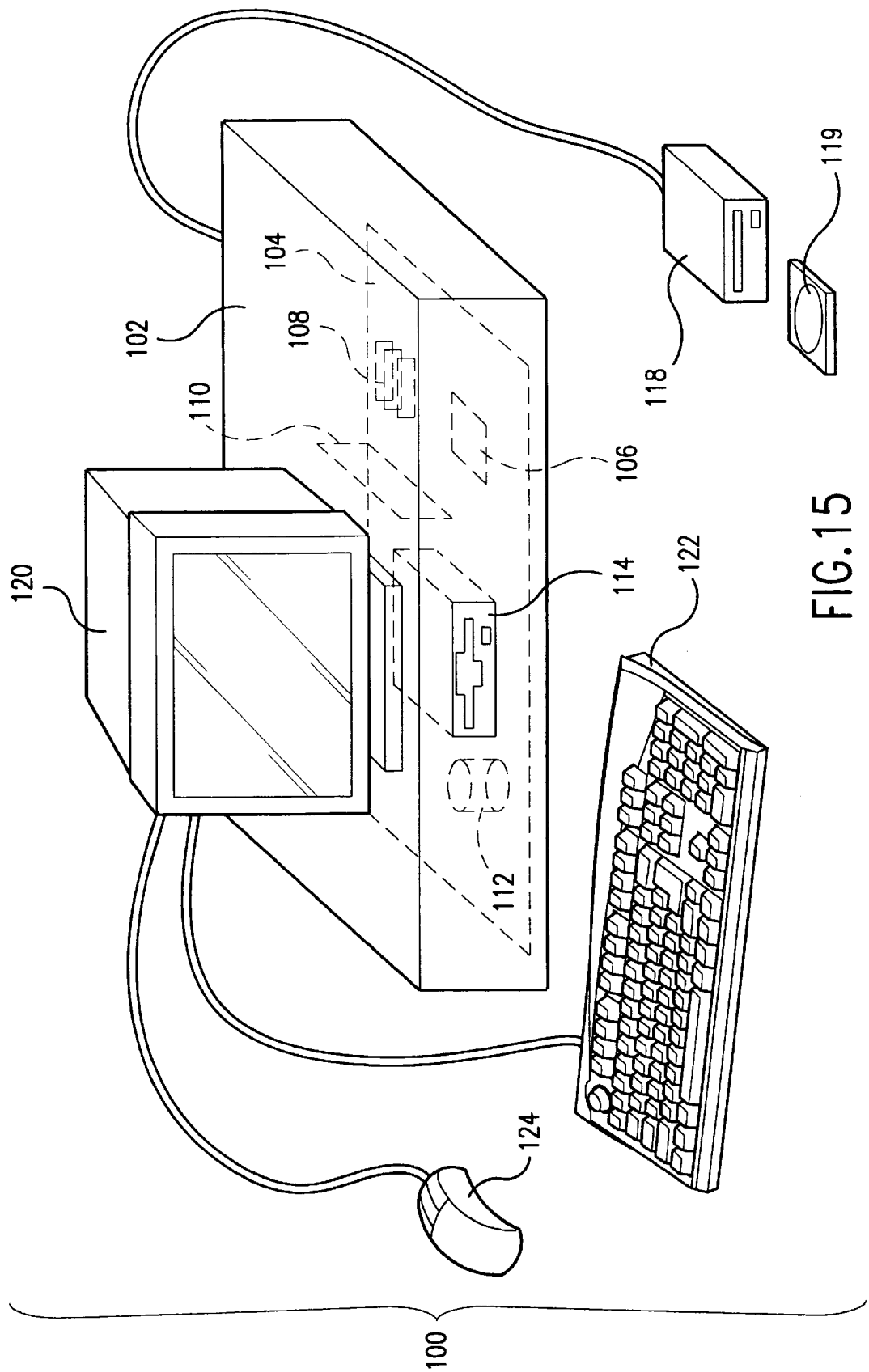
FIG. 15 is a schematic illustration of a general purpose computer 100 programmed according to the teachings of the present invention.

FIG. 15 is a schematic illustration of a computer system for the assessment of tumor extent in magnetic resonance images. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for performing any of steps S1 through S12, described above. The computer code devices of the present invention can be any interpreted or executable code mechanism, including but not limited to scripts, interpreters, dynamic link libraries, Java classes, and complete executable programs.

Obviously, numerous modifications and variations of the present invention are possible in light of the above teachings. It is therefore to be understood that within the scope of the appended claims, the invention may be practiced otherwise than as specifically described herein.

APPENDIX

References

Gribbestad, I. S., Nilsen, G., Fjsne, H., Fougner, R., Haugen, O. A., Petersen, S. B., Rinck, P. A. and Kvinnsland, S., Contrast-enhanced magnetic resonance imaging of the breast, Acta Oncologica 8, 1992, 833–842.

Boetes, C., Mus, R. D. M., Holland, R., Barentsz, J. O., Strijk, S. P., Wobbes, T., Hendriks, J. H. C. L., and Ruys, S. H. J., Breast tumors: comparative accuracy of MR imaging relative to mammography and US for demonstrating extent, Radiology 197, 1995, 743–747.

Davis, P. L., Staiger, M. J., Harris, K. B., Gannot, M. A., Klementaviciene, J., McCarty K. S. Jr., and Tobon H., Breast cancer measurements with magnetic resonance imaging, ultrasonography, and mammography, Breast Cancer Res. Treat. 37, 1996, 1–9.

Mumtaz, H., Hall-Graggs, M. A., Davidson, T., Walmsley, K., Thurell, W., Kissin, M. W., and Taylor, I., Staging of primary breast cancer with MR imaging, AJR 169, 1997, 417–424.

Kupinski, M., and Giger, M., Automated seeded lesion segmentation on digital mammograms, IEEE trans. Med. Imaging, in press, 1998.

Lucas-Quesada, F. A., Sinha, U., and Sinha S., Segmentation strategies for breast tumors from dynamic MR images, J. Magn. Reson. Imaging 6, 1996, 753–763.

Gilhuijs, K. G. A., Giger, M., and Bick, U., Computerized analysis of breast lesions in three dimensions using dynamic magnetic resonance imaging, Med. Phys. 25, 1998, 1647–1654.

Otsu, N., A threshold selection method from gray-value histograms, IEEE transactions on systems, man, and cybernetics 9, 1997, 62–66.

What is claimed as new and desired to be secured by Letters Patent of the United States is:

1. A method for assessing tumor extent in medical temporally acquired images, comprising:
   obtaining image data corresponding to temporally acquired images including a tumor and surrounding anatomy; and
   performing variance processing with respect to time on the obtained image data to derive variance image data defining a variance image indicative of variation of voxels in said temporally acquired medical images over time.

2. The method of claim 1, wherein the obtaining step comprises:
   obtaining magnetic resonance (MR) image data representing temporal progression of a contrast agent in said tumor and surrounding anatomy.

3. The method of claim 1, further comprising:
   performing extent processing on the variance image data to determine the extent of the tumor.

4. The method of claim 3, wherein:
   said variance processing step comprises weighting each voxel as a function of temporal change in value of the voxel due to contrast uptake to obtain said variance image data; and
   said extent processing step comprises,
   determining a mean value function based on the mean value of the values of voxels of the variance image data that intersect the surface of a sphere which has a center defined by a seed point, as a function of radius of the sphere, and
   determining a radius which closely encompasses an uptake region of said tumor based on the mean value function.

5. The method of claim 4, further comprising:
   performing thresholding on the variance image data to detect said seed point.

6. The method of claim 5, wherein said step of performing thresholding comprises:
   identifying voxels with a higher value than that of other voxels and using at least one of the identified voxels as said seed point.

7. The method of claim 6, wherein said step of performing thresholding comprises:
   detecting plural clusters of voxels with a higher value than that of other voxels, and using a voxel at a center of said plural clusters of voxels as said seed point.

8. The method of claim 4, wherein said extent processing step comprises:
   low pass filtering said mean value function to produce an expansion function.

9. The method of claim 8, where said extent processing step comprises determining said radius which closely encompasses said uptake region of said tumor based on the expansion function.

10. The method of claim 9, wherein said extent processing step comprises:
    determining said radius which closely encompasses said uptake region of said tumor as that radius corresponding to the first point in said expansion function after a global maximum at which the derivative of the expansion function reaches zero.

11. The method of claim 4, wherein said extent processing comprises:
    producing a binary image representative of a bounding sphere defined by said radius which closely encompasses said uptake region of said tumor; and
    multiplying said variance image with data derived from said binary image to suppress data outside said bounding sphere and to identify a volume growing target region.

12. The method of claim 11, wherein said extent processing comprises:
    determining a threshold to terminate volume growing in said volume growing target region;
    starting from a predetermined voxel having a value exceeding said threshold, performing volume growing processsing by comparing neighboring voxels to said threshold, and adding to a region growing volume those neighboring voxels bearing a predetermined relationship to said threshold in dependence on the result of the comparison; and
    performing further iterative comparing, in which for each voxel included in said region growing volume, voxels neighboring thereto are compared to said threshold and included in said region growing volume in dependence on the result of the comparison.

13. The method of claim 12, further comprising:
    identifying said voxels included in said region growing volume as being tumor voxels.

14. The method of claim 7, further comprising:
    performing thresholding on the variance image data to detect said seed point.

15. The method of claim 14, wherein said step of starting from a predetermined voxel having a value exceeding said threshold comprises starting from that voxel closest to said seed point and having a value exceeding said threshold to terminate volume growing in said volume growing target region.

16. The method of claim 14, wherein said step of performing thresholding comprises:
    identifying voxels with a higher value than that of other voxels and using at least one of the identified voxels as said seed point.

17. The method of claim 16, wherein said step of starting from a predetermined voxel having a value exceeding said threshold comprises starting from said seed point when said seed point has a value equal to or exceeding the threshold to terminate volume growing in said volume growing target region.

18. The method of claim 16, wherein said step of performing thresholding comprises:

detecting plural clusters of voxels with a higher value than that of other voxels, and using a voxel at a center of said plural clusters of voxels as said seed point.

19. The method of claim 18, wherein said step of starting from a predetermined voxel having a value exceeding said threshold comprises starting from said seed point when said seed point has a value equal to or exceeding the threshold to terminate volume growing in said volume growing target region.

20. The method of claim 4, wherein said extent processing comprises:

producing a binary image representative of a bounding sphere defined by said radius which closely encompasses said uptake region of said tumor;

smoothing said binary image to obtain a smoothed binary image; and multiplying said variance image with data derived from said smoothed binary image.

21. The method of claim 1, wherein said step of obtaining image data comprises:

obtaining image data including a breast of a subject; and segmenting the breast volume from the rest of the obtained image data.

22. The method of claim 21, wherein said step of segmenting comprises:

performing 3-dimensional morphological processing to remove small gaps and spikes from the obtained image data;

determining a global histogram of voxel values from the image data after performing 3-dimensional morphological processing;

determining a threshold from the global histogram by maximization of the inter-class variance between peaks in said global histogram; and defining the breast volume based on those voxels having a value exceeding the threshold determined from the global histogram.

23. The method of claim 22, wherein said step of defining a breast volume comprises:

performing a sequence of contour tracing and region filling steps to remove gaps in the voxels having a value exceeding the threshold determined from the global histogram.

24. The method of claim 23, further comprising:

removing a border of the segmented breast volume by morphological erosion.

25. The method of claim 21, further comprising:

removing a border of the segmented breast volume by morphological erosion.

26. The method of claim 1, further comprising:

performing thresholding on the variance image data to detect potential tumor sites.

27. The method of claim 13, further comprising:

performing thresholding on the variance image data to detect said seed point.

28. The method of claim 27, wherein said step of performing thresholding comprises:

identifying voxels with a higher value than that of other voxels and using at least one of the identified voxels as said seed point.

29. The method of claim 28, wherein said step of performing thresholding comprises:

detecting plural clusters of voxels with a higher value than that of other voxels, and using a voxel at a center of said plural clusters of voxels as said seed point.

30. A computer readable medium storing computer instructions for assessing tumor extent in medical temporally acquired images, by performing the steps of:

obtaining image data corresponding to temporally acquired images including a tumor and surrounding anatomy; and performing variance processing with respect to time on the obtained image data to derive variance image data defining a variance image indicative of variation of voxels in said temporally acquired medical images over time.

31. The computer readable medium of claim 30, wherein the obtaining step comprises:

obtaining magnetic resonance (MR) image data representing temporal progression of a contrast agent in said tumor and surrounding anatomy.

32. The computer readable medium of claim 30, further comprising:

performing extent processing on the variance image data to determine the extent of the tumor.

33. The computer readable medium of claim 32, wherein:

said variance processing step comprises weighting each voxel as a function of temporal change in value of the voxel due to contrast uptake to obtain said variance image data; and said extent processing step comprises, determining a mean value function based on the mean value of the values of voxels of the variance image data that intersect the surface of a sphere which has a center defined by a seed point, as a function of radius of the sphere, and determining a radius which closely encompasses an uptake region of said tumor based on the mean value function.

34. The computer readable medium of claim 33, further comprising:

performing thresholding on the variance image data to detect said seed point.

35. The computer readable medium of claim 34, wherein said step of performing thresholding comprises:

identifying voxels with a higher value than that of other voxels, and using at least one of the identified voxels as said seed point.

36. The computer readable medium of claim 35, wherein said step of performing thresholding comprises:

detecting plural clusters of voxels with a higher value than that of other voxels, and using a voxel at a center of said plural clusters of voxels as said seed point.

37. The computer readable medium of claim 33, wherein said extent processing step comprises:

low pass filtering said mean value function to produce an expansion function.

38. The computer readable medium of claim 37, where said extent processing step comprises determining said radius which closely encompasses said uptake region of said tumor based on the expansion function.

39. The computer readable medium of claim 38, wherein said extent processing step comprises:

determining said radius which closely encompasses said uptake region of said tumor as that radius corresponding to the first point in said expansion function after a global maximum at which the derivative of the expansion function reaches zero.

40. The computer readable medium of claim 33, wherein said extent processing comprises:
- producing a binary image representative of a bounding sphere defined by said radius which closely encompasses said uptake region of said tumor; and
- multiplying said variance image with data derived from said binary image to suppress data outside said bounding sphere and to identify a volume growing target region.

41. The computer readable medium of claim 40, wherein said extent processing comprises:
- determining a threshold to terminate volume growing in said volume growing target region;
- starting from a predetermined voxel having a value exceeding said threshold, performing volume growing processsing by comparing neighboring voxels to said threshold, and adding to a region growing volume those neighboring voxels bearing a predetermined relationship to said threshold in dependence on the result of the comparison; and
- performing further iterative comparing, in which for each voxel included in said region growing volume, voxels neighboring thereto are compared to said threshold and included in said region growing volume in dependence on the result of the comparison.

42. The computer readable medium of claim 41, further comprising:
- identifying said voxels included in said region growing volume as being tumor voxels.

43. The computer readable medium of claim 42, further comprising:
- performing thresholding on the variance image data to detect said seed point.

44. The computer readable medium of claim 43, wherein said step of performing thresholding comprises:
- identifying voxels with a higher value than that of other voxels and using at least one of the identified voxels as said seed point.

45. The computer readable medium of claim 44, wherein said step of performing thresholding comprises:
- detecting plural clusters of voxels with a higher value than that of other voxels, and using a voxel at a center of said plural clusters of voxels as said seed point.

46. The computer readable medium of claim 44, further comprising:
- performing thresholding on the variance image data to detect said seed point.

47. The computer readable medium of claim 46, wherein said step of starting from a predetermined voxel having a value exceeding said threshold comprises starting from that voxel closest to said seed point and having a value exceeding said threshold to terminate volume growing in said volume growing target region.

48. The computer readable medium of claim 46, wherein said step of performing thresholding comprises:
- identifying voxels with a higher value than that of other voxels, and using at least one of the identified voxels as said seed point.

49. The computer readable medium of claim 48, wherein said step of starting from a predetermined voxel having a value exceeding said threshold comprises starting from said seed point when said seed point has a value equal to or exceeding the threshold to terminate volume growing in said volume growing target region.

50. The computer readable medium of claim 48, wherein said step of performing thresholding comprises:
- detecting plural clusters of voxels with a higher value than that of other voxels, and using a voxel at a center of said plural clusters of voxels as said seed point.

51. The computer readable medium of claim 50, wherein said step of starting from a predetermined voxel having a value exceeding said threshold comprises starting from said seed point when said seed point has a value equal to or exceeding the threshold to terminate volume growing in said volume growing target region.

52. The computer readable medium of claim 30, wherein said step of obtaining image data comprises:
- obtaining image data including a breast of a subject; and
- segmenting the breast volume from the rest of the obtained image data.

53. The computer readable medium of claim 52, wherein said step of segmenting comprises:
- performing 3-dimensional morphological processing to remove small gaps and spikes from the obtained image data;
- determining a global histogram of voxel values from the image data after performing 3-dimensional morphological processing;
- determining a threshold from the global histogram by maximization of the inter-class variance between peaks in said global histogram; and
- defining the breast volume based on those voxels having a value exceeding the threshold determined from the global histogram.

54. The computer readable medium of claim 53, wherein said step of defining a breast volume comprises:
- performing a sequence of contour tracing and region filling steps to remove gaps in the voxels having a value exceeding the threshold determined from the global histogram.

55. The computer readable medium of claim 54, further comprising:
- removing a border of the segmented breast volume by morphological erosion.

56. The computer readable medium of claim 52, further comprising:
- removing a border of the segmented breast volume by morphological erosion.

57. The computer readable medium of claim 33, wherein said extent processing comprises:
- producing a binary image representative of a bounding sphere defined by said radius which closely encompasses said uptake region of said tumor;
- smoothing said binary image to obtain a smoothed binary image; and
- multiplying said variance image with data derived from said smoothed binary image.

58. The computer readable medium of claim 30, further comprising:
- performing thresholding on the variance image data to detect potential tumor sites.

59. A system for assessing tumor extent in medical temporally acquired images, comprising:
- a mechanism configured to obtain image data corresponding to temporally acquired images including a tumor and surrounding anatomy; and
- a mechanism configured to perform variance processing with respect to time on the obtained image data to derive variance image data defining a variance image indicative of variation of voxels in said temporally acquired medical images over time.

60. The system of claim 59, wherein the mechanism configured to obtain image data comprises:
a mechanism configured to obtain magnetic resonance (MR) image data representing temporal progression of a contrast agent in said tumor and surrounding anatomy.

61. The system of claim 59, further comprising:
a mechanism configured to perform extent processing on the variance image data to determine the extent of the tumor.

62. The system of claim 61, wherein:
said mechanism configured to perform said variance processing comprises weighting each voxel as a function of temporal change in value of the voxel due to contrast uptake to obtain said variance image data; and
said mechanism configured to perform extent processing comprises,
a mechanism configured to determine a mean value function based on the mean value of the values of voxels of the variance image data that intersect the surface of a sphere which has a center defined by a seed point, as a function of radius of the sphere, and
a mechanism configured to determine a radius which closely encompasses an uptake region of said tumor based on the mean value function.

63. The system of claim 62, wherein said mechanism configured to perform extent processing comprises:
a mechanism configured to produce a binary image representative of a bounding sphere defined by said radius which closely encompasses said uptake region of said tumor;
a mechanism configured to smooth said binary image to obtain a smoothed binary image; and
a mechanism configured to multiply said variance image with data derived from said smoothed binary image.

64. The system of claim 62, wherein said mechanism configured to perform extent processing comprises:
a mechanism configured to low pass filter said mean value function to produce an expansion function.

65. The system of claim 64, where said mechanism configured to perform extent processing comprises:
a mechanism configured to determine said radius which closely encompasses said uptake region of said tumor based on the expansion function.

66. The system of claim 65, wherein said mechanism configured to perform extent processing comprises:
a mechanism configured to determine said radius which closely encompasses said uptake region of said tumor as that radius corresponding to the first point in said expansion function after a global maximum at which the derivative of the expansion function reaches zero.

67. The system of claim 62, wherein said mechanism configured to perform extent processing comprises:
a mechanism configured to produce a binary image representative of a bounding sphere defined by said radius which closely encompasses said uptake region of said tumor; and
a mechanism configured to multiply said variance image with data derived from said binary image to suppress data outside said bounding sphere and to identify a volume growing target region.

68. The system of claim 67, wherein said extent processing comprises:
a mechanism configured to determine a threshold to terminate volume growing in said volume growing target region;

a mechanism configured to perform volume growing processssing, starting from a predetermined voxel having a value exceeding said threshold, by comparing neighboring voxels to said threshold, and adding to a region growing volume those neighboring voxels bearing a predetermined relationship to said threshold in dependence on the result of the comparison; and
a mechanism configured to perform further iterative comparing, in which for each voxel included in said region growing volume, voxels neighboring thereto are compared to said threshold and included in said region growing volume in dependence on the result of the comparison.

69. The system of claim 68, further comprising:
a mechanism configured to perform thresholding on the variance image data to detect said seed point.

70. The system of claim 69, wherein said mechanism configured to perform thresholding comprises:
a mechanism configured to identify voxels with a higher value than that of other voxels, and to use at least one of the identified voxels as said seed point.

71. The system of claim 70, wherein said mechanism configured to perform thresholding comprises:
a mechanism configured to detect plural clusters of voxels with a higher value than that of other voxels, and to use a voxel at a center of said plural clusters of voxels as said seed point.

72. The system of claim 71, wherein said mechanism configured to perform volume growing processing is further configured to start said volume growing processing from said seed point when said seed point has a value equal to or exceeding the threshold to terminate volume growing in said volume growing target region.

73. The system of claim 69, wherein said mechanism configured to perform volume growing processing is further configured to start said volume growing processing from that voxel closest to said seed point and having a value exceeding said threshold to terminate volume growing in said volume growing target region.

74. The system of claim 70, wherein said mechanism configured to perform volume growing processing is further configured to start said volume growing processing from said seed point when said seed point has a value equal to or exceeding the threshold to terminate volume growing in said volume growing target region.

75. The system of claim 68, further comprising:
a mechanism configured to identify said voxels included in said region growing volume as being tumor voxels.

76. The system of claim 75, further comprising:
a mechanism configured to perform thresholding on the variance image data to detect said seed point.

77. The system of claim 76, wherein said mechanism configured to perform thresholding comprises:
a mechanism configured to identify voxels with a higher value than that of other voxels, and to use at least one of the identified voxels as said seed point.

78. The system of claim 77, wherein said mechanism configured to perform thresholding comprises:
a mechanism configured to detect plural clusters of voxels with a higher value than that of other voxels, and to use a voxel at a center of said plural clusters of voxels as said seed point.

79. The system of claim 62, further comprising:
a mechanism configured to perform thresholding on the variance image data to detect said seed point.

80. The system of claim 79, wherein said mechanism configured to perform thresholding comprises:

a mechanism configured to identify voxels with a higher value than that of other voxels, and to use at least one of the identified voxels as said seed point.

81. The system of claim 80, wherein said mechanism configured to perform thresholding comprises:

a mechanism configured to detect plural clusters of voxels with a higher value than that of other voxels, and to use a voxel at a center of said plural clusters of voxels as said seed point.

82. The system of claim 59, wherein said mechanism configured to obtain image data comprises:

a mechanism configured to obtain image data including a breast of a subject; and a mechanism configured to segment the breast volume from the rest of the obtained image data.

83. The system of claim 82, wherein said a mechanism configured to perform segmenting comprises:

a mechanism configured to perform 3-dimensional morphological processing to remove small gaps and spikes from the obtained image data;

a mechanism configured to determine a global histogram of voxel values from image data received from the mechanism configured to perform 3-dimensional morphological processing;

a mechanism configured to determine a threshold from the global histogram by maximization of the inter-class variance between peaks in said global histogram; and a mechanism configured to define the breast volume based on those voxels having a value exceeding the threshold determined from the global histogram.

84. The system of claim 83, wherein said mechanism configured to define a breast volume comprises:

a mechanism configured to perform a sequence of contour tracing and region filling steps to remove gaps in the voxels having a value exceeding the threshold determined from the global histogram.

85. The system of claim 84, further comprising:

a mechanism configured to remove a border of the segmented breast volume by morphological erosion.

86. The system of claim 82, further comprising:

a mechanism configured to remove a border of the segmented breast volume by morphological erosion.

87. The system of claim 59, further comprising:

a mechanism configured to perform thresholding on the variance image data to detect potential tumor sites.

* * * * *